C. C. WAKEFIELD.
LUBRICATOR.
APPLICATION FILED JAN. 5, 1915.

1,154,353.

Patented Sept. 21, 1915.

Witnesses:

Inventor
C. C. Wakefield,
By Bakewell, Byrnes & Parmelee
Attys.

UNITED STATES PATENT OFFICE.

CHARLES CHEERS WAKEFIELD, OF LONDON, ENGLAND.

LUBRICATOR.

1,154,353.   Specification of Letters Patent.   Patented Sept. 21, 1915.

Application filed January 5, 1915. Serial No. 569.

*To all whom it may concern:*

Be it known that I, CHARLES CHEERS WAKEFIELD, a subject of the King of England, residing at London, England, have invented certain new and useful Improvements in Lubricators, of which the following is a specification.

This invention is for improvements in or relating to lubricators which supply lubricant to the working-fluid of a mechanism so that it is carried by it into the parts of the mechanism that are to be lubricated. Such lubricators are particularly adapted for use with pneumatically-operated hand tools and the like.

The invention relates to the type of lubricator wherein a perforated lubricant-container is placed in the conduit through which the working-fluid of the mechanism to be lubricated passes, so that as the lubricant oozes out from the container it can be carried forward by the working-fluid to the mechanism.

According to the present invention, there is employed with a lubricator of the type described, a layer of absorbent material (for example worsted) which surrounds the perforated container within the working-fluid conduit or conduit-section and covers all the perforations in the container wall. It is found that by covering all the perforations with the absorbent material the advantage is gained that the lubricant does not flow through the material when no working-fluid is passing through the conduit in which the container is mounted. This is due to the fact that air cannot enter the perforations to allow the lubricant to escape, whereas when the working-fluid is passing through the conduit under pressure some of it forces its way into the container and liberates the lubricant.

Conveniently an outer perforated retaining-member is provided also as part of the wall of the oil-container to keep the absorbent material in place and prevent it from being carried away by the rush of the working-fluid.

Figure 1:
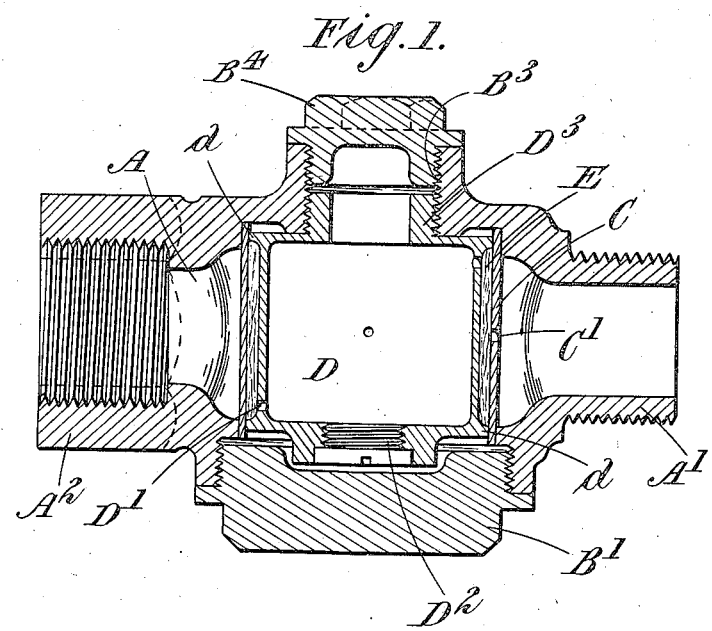
Figure 2:
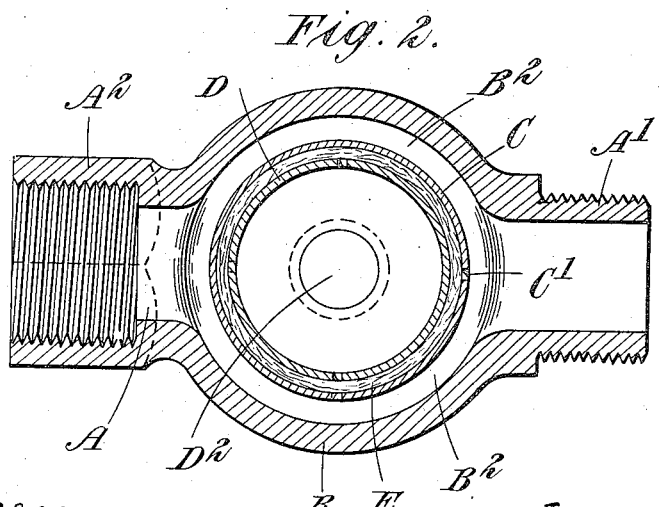

In the accompanying drawings, which illustrate one method of carrying out this invention, Figure 1 is a longitudinal section through part of the conduit for the working-fluid and the oil-container therein and Fig. 2 is a longitudinal section through the same parts at right-angles to that of Fig. 1.

The same letters indicate the same parts in the drawings.

The part A constitutes a section of the conduit for the working-fluid and can be connected, say, by the screw-threaded nose $A^1$, to the rest of the pipe-line, and by the internally threaded socket $A^2$ direct to the pneumatic tool or other fluid-operated mechanism which has to be fed with the working-fluid and at the same time lubricated. The part A thus constitutes a section of the conduit for the working fluid, and if desired it could of course be inserted between two lengths of conduit, but preferably it is made the end section of the conduit so that the lubricant is readily carried direct into the tool.

The conduit section A has in it a drum-shaped enlargement B, one of the flat sides of which is provided with a detachable screw-threaded plug $B^1$.

In the enlargement a metal sleeve C is mounted having perforations $C^1$ at various points. This sleeve extends right across the enlargement from one flat side to the other and is fixed permanently in place, but its diameter is smaller than that of the enlargement so that free passage is allowed for the working fluid around it as shown at $B^2$.

The lubricant is contained in a cylindrical or drum-shaped chamber D which may be of metal and is provided with perforations $D^1$. This has a closing screw-threaded plug $D^2$ at one end and an external screw-threaded neck $D^3$ at the other end, which is open. The screw-threaded neck engages a screw-threaded orifice $B^3$ on the flat side of the drum-shaped enlargement of the conduit A opposite the side closed by the plug $B^1$, and the opening $B^3$ is finally closed by a detachable screw-threaded plug $B^4$.

The casing D constitutes an inner perforated supporting-member for a layer of absorbent material E. This may conveniently consist of worsted and may be wound on the exterior of the supporting-member between shoulders or flanges $d$ provided on it for this purpose.

The oil-container therefore comprises the inner perforated supporting-member D, the layer of porous or absorbent material E and the outer perforated retaining member C.

In assembling the parts the sleeve C is permanently fixed in place and the casing D with its winding of worsted is then entered from the side of the enlargement which afterward is closed by the plug B¹. It will be seen that the opening closed by this plug is big enough to freely admit the member D with its winding of worsted, and the neck of the casing D is screwed into the orifice B³ on the opposite side of the enlargement so that it is firmly held in place. The plug D² is normally kept closed but may be removed for cleaning purposes if desired, but the neck D³ is left open for charging purposes. After the oil-container is in place the plug B¹ is screwed tight home and is not again removed unless it is desired to withdraw the oil-container, say for renewing the worsted, but the plug B⁴ is removed whenever it is necessary to recharge the container with lubricant.

In the operation of this device the lubricant passes through the orifices D¹ in the inner supporting-member D of the container and oozes through the absorbent material E and finally passes through the orifices C¹ in the sleeve C and spreads on the outer surface of the sleeve, where it is caught away by the rush of the working fluid as it passes around the oil-container in the passages B² of the enlargement B in the conduit A.

It will thus be seen that the container built up in this manner really provides a porous wall through which a certain amount of lubricant is always percolating and is then carried away from the outside of the chamber by the working fluid into the tool or other mechanism which the fluid operates, and thus the working parts of the mechanism are kept constantly lubricated.

It will readily be understood by those familiar with the art that various changes may be made in the details of construction of the device, as well as the means for securing the device in proper position in the path of the motor actuating fluid, without departing from the spirit and scope of my invention as defined in the appended claims. It will be noted that the wall D of the container and also the retaining-member C are both provided with but few orifices D¹ and C¹ respectively, so that no free flow of the lubricant takes place.

What I claim as my invention and desire to secure by Letters Patent is:—

1. In a lubricator the combination of, a perforated lubricant-container placed in the conduit through which the working fluid of the mechanism to be lubricated passes, and a layer of absorbent material surrounding the perforated container and covering all the perforations in the container-wall for the purpose set forth.

2. In a lubricator the combination of, a perforated lubricant container placed in the conduit through which the working fluid of the mechanism to be lubricated passes, and a layer of worsted surrounding the perforated container and covering all the perforations in the container wall, for the purpose set forth.

3. In a lubricator the combination of, a perforated lubricant container placed in the conduit through which the working fluid of the mechanism to be lubricated passes, and a layer of absorbent material surrounding the perforated container which perforations are few in number, for the purpose set forth.

4. In a lubricator the combination of, a perforated lubricant container placed in the conduit through which the working fluid of the mechanism to be lubricated passes, a layer of absorbent material surrounding the perforated container and covering all the perforations in the container wall, and an outer perforated retaining-member for the absorbent layer, for the purpose set forth.

5. In a lubricator the combination of, a perforated lubricant-container placed in the conduit through which the working fluid of the mechanism to be lubricated passes, a layer of absorbent material surrounding the perforated container and covering all the perforations in the container wall, and an outer perforated retaining-member for the absorbent layer, the perforations in this retaining-member being staggered relatively to those in the container, for the purpose set forth.

6. In a lubricator, the combination with a conduit-section for the working-fluid having a drum-shaped enlargement provided with means for opening it at one of the flat sides, of a cylindrical perforated lubricant-container, and a covering of absorbent material therefor, the container with the absorbent material fitting into the enlargement but leaving room for the working-fluid to pass around the walls of the containers, substantially as set forth.

7. In a lubricator the combination with a conduit section for the working-fluid having a drum-shaped enlargement provided with means for opening it at one of the flat sides, of a cylindrical perforated lubricant-container, a covering of absorbent material therefor, the container with the absorbent material fitting into the enlargement but leaving room for the working-fluid to pass around the walls of the container, and an outer cylindrical retaining-member for the absorbent material which is also perforated, substantially as set forth.

8. In a lubricator the combination with a conduit-section for the working-fluid having a drum-shaped enlargement provided with means for opening it at one of the flat sides, of a cylindrical perforated lubricant-container, a covering of absorbent material therefor, the container with the absorbent material fitting into the enlargement but leaving room for the working-fluid to pass around the walls of the container, and an outer cylindrical retaining-member for the absorbent material which is also perforated and is permanently secured in the enlargement of the conduit-section, substantially as set forth.

9. In a lubricator the combination of, a conduit-section for the working-fluid having a drum-shaped enlargement, a screw-threaded plug constituting one of the flat sides of the enlargement so that this side can be removed, a cylindrical perforated lubricant-container, and a covering of absorbent material therefor, the container with the absorbent material fitting into the enlargement but leaving room for the working-fluid to pass around the walls of the container, substantially as set forth.

10. In a lubricator the combination of, a conduit-section for the working-fluid having a drum-shaped enlargement, a screw-threaded plug which constitutes one of the flat sides of the enlargement, a cylindrical perforated lubricant-container provided with a covering of absorbent material which container fits into the enlargement so that the working-fluid can pass around the walls of the container, the orifice in the enlargement which receives the aforesaid plug being large enough to admit the container to the interior of the enlargement, the container being closed on that flat side which is toward the plug in the enlargement and open at the other side, and a detachable plug in the other side of the enlargement whereby the container can be filled, substantially as set forth.

11. A lubricator for fluid actuated motors, comprising a perforated container for the lubricant arranged to be inserted in the path of the motor actuating fluid, and a covering of absorbent material for said perforations, for the purpose set forth.

12. A lubricator for fluid actuated motors, comprising a perforated container for the lubricant arranged to be inserted in the path of the motor actuating fluid, a covering of absorbent material for said perforations, and means for retaining said covering in position on the container, for the purpose set forth.

13. A lubricator for fluid actuated motors, comprising a container arranged to be placed in the path of the motor actuating fluid, said container having perforations through its walls, a layer of absorbent material surrounding the container, and a perforated shell surrounding the absorbent material, for the purpose set forth.

In testimony whereof I have signed my name to this specification in the presence of two subscribing witnesses.

CHARLES CHEERS WAKEFIELD.

Witnesses:
  STANLEY R. MOORE,
  O. G. WORTH.